United States Patent [19]

Habicht

[11] Patent Number: 5,388,807
[45] Date of Patent: Feb. 14, 1995

[54] MODULAR BUTTERFLY VALVE

[76] Inventor: Helmut Habicht, 15 Royal Park Ter., Hillsdale, N.J. 07728

[21] Appl. No.: 282,616

[22] Filed: Jul. 29, 1994

[51] Int. Cl.⁶ ............................................. F16K 1/22
[52] U.S. Cl. ................................. 251/306; 251/305
[58] Field of Search ............................... 251/305, 306

[56] References Cited

U.S. PATENT DOCUMENTS

| | | | |
|---|---|---|---|
| 3,325,142 | 6/1967 | Thompson | 251/306 |
| 3,874,631 | 4/1975 | Osthues | 251/306 X |
| 5,236,003 | 8/1993 | Habiucht | 251/306 X |

*Primary Examiner*—John C. Fox
*Attorney, Agent, or Firm*—Patrick J. Pinto

[57] ABSTRACT

A modular butterfly valve includes a disc member which is adapted for selective rotation between an open and a closed position, a housing, a resilient valve seat, and a clamping ring which are held together by a hinged quick coupling ring. The disc member is resiliently suspended by the valve seat which provides a self-centering of the disc member in a direction transverse to a direction of material flow. This butterfly valve further includes at least one means for limiting the displacement of the disc member in a direction which is parallel to the direction of material flow when loads are placed thereon.

11 Claims, 2 Drawing Sheets

MODULAR BUTTERFLY VALVE

BACKGROUND OF THE INVENTION

1. Field of the Invention

With regard to the classification of art, this invention is believed to be found in the general class entitled "Valves and Valve Actuation" and more particularly to those subclasses pertaining to rotary butterfly valves.

2. Description of Related Art

Butterfly valves are known in the prior art. One example of prior art is U.S. Pat. No. 5,236,003 which issued to Habicht on Aug. 17, 1993. U.S. Pat. No. 5,236,003 is solely owned by the present inventor.

U.S. Pat. No. 5,236,003 has been successfully used in many material handling applications. This cited prior art patent is primarily used with small hoppers or funnels which have limited capacity. The quick coupling and modular design has resulted in that valve being used at the discharge or feed end of large hoppers and the like. It has been found that the self-centering features of U.S. Pat. No. 5,236,003 has at least one disadvantage when used with heavy loads. That disadvantage allows the disc member to be displaced in a direction which is parallel to the flow of material. For example: If the load being supported by the disc is very heavy, the disc member is displaced downward. This downward shifting of the disc member has been found to mar the surface of the valve seat when the disc member is rotated.

While it is easy to replace the valve seat in the cited prior art, it is not always desirable. Therefore, it has been determined that an improvement to the cited prior art was necessary, This improvement should retain the self-centering properties of the cited prior art while increasing its load carrying ability.

The present invention solves the identified need as described above.

SUMMARY OF THE INVENTION

In brief the present invention may be summarized as a modular butterfly valve having improved load bearing capability comprising:

a) a disc member adapted to be rotated between an open position and a closed position, the disc member having opposing hubs, each hub having a shaft member extending therefrom, a first of the shaft members having a sufficient length for extending exterior of the said butterfly valve, a second of the shaft members having a reduced diameter portion, the reduced diameter portion having a predetermined length;

b) a housing having a first cylindrical through bore and a counterbore formed concentrically with the first through bore, the counterbore having a determined depth for providing a shelf portion, the housing further including a first retaining flange and a second retaining flange, the first retaining flange being selectively contoured for engagement by a first quick coupling ring, the second retaining flange being selectively contoured for engagement by a second quick coupling ring, a transverse aperture being adapted for allowing said first of said shaft members to pass therethrough with a predetermined first clearance, a second shelf having a predetermined size and depth, the second shelf being formed in a wall of the housing diametrically opposite the transverse aperture;

c) a resilient valve seat having an outer diameter, a selectively contoured seat portion, a pair of flats, and a pair of transverse apertures, the valve seat having a predetermined length, the outer diameter being sized to closely and removably seat into said counterbore of said housing, each transverse aperture having a predetermined diameter for closely journalling said first and second of said shaft members;

d) a clamping ring having a second through bore, a pilot diameter, and a third retaining flange, the second through bore being substantially equal in diameter to the first through bore, the pilot diameter of the clamping ring being adapted to removably seat in the counterbore while retaining the valve seat in a preferred arrangement between a face of the clamping ring and the shelf portion of the housing, the third retaining flange being sized and contoured for a coupled abutment with the second retaining flange of the housing by the coupling ring; and wherein the disc member is resiliently suspended by said resilient valve seat for allowing self centering of said disc member in a direction transverse to material flow, a second clearance between the reduced diameter portion of the second of the shaft members and the second shelf cooperating with the first clearance for limiting movement of the disc memer with respect to the valve seat in a direction of material flow.

In addition to the above summary, the following disclosure is intended to be detailed to insure adequacy and aid in the understanding of the invention, However, this disclosure, showing embodiments of the invention, is not intended to describe each new inventive concept which may arise. These specific embodiments have been chosen to show at least one best mode for the valve of the present invention. These specific embodiments may also be diagrammatic for the purpose of illustration and description as shown in the accompanying drawings.

Figure 2:
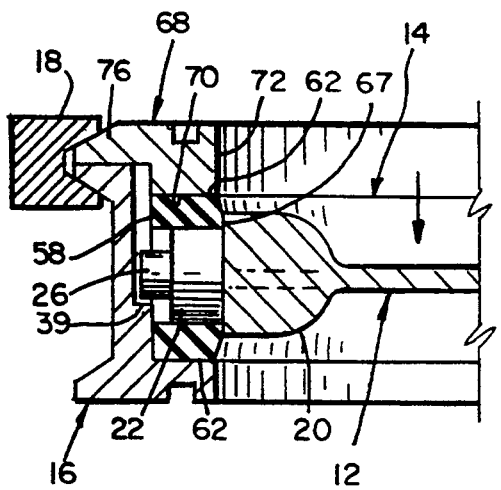
FIG. 2 represents section view of the present invention, this view being taken along line 2—2 of FIG. 1.

In the following description and in the claims, various details are identified by specific names for convenience. These names are intended to be generic in their application while differentiating between the various details. Corresponding reference numbers refer to like members throughout the several figures of the drawing.

The drawing accompanying and forming a part of this specification disclose details of construction for the sole purpose of explanation. It is to be understood that structural details may be modified without departing from the concept and principles of the invention as claimed. This invention may be incorporated into other structural forms than shown.

DETAILED DESCRIPTION OF THE INVENTION

Referring to FIGS. 1, 2, 3 and 4, a modular butterfly valve assembly of the present invention is generally identified as 10. The construction of this valve 10 is very similar to the valve disclosed in U.S. Pat. No. 5,236,003.

This butterfly valve assembly 10 includes a disc member 12, a valve seat 14, a housing 16, and at least one hinged quick coupling ring 18.

Figure 3:
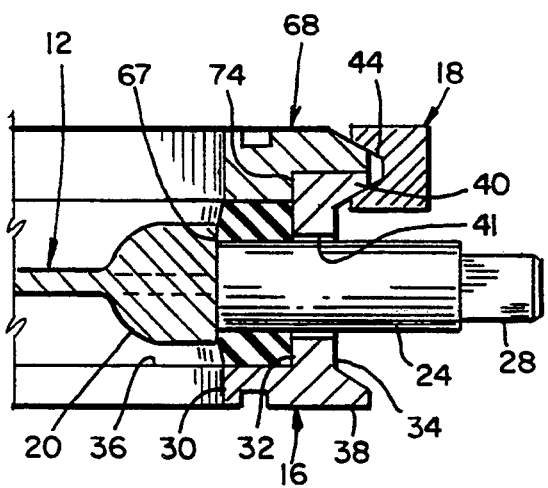
FIG. 3 represents a sectional view of the present invention, this view being taken along line 3—3 of FIG. 1.

The disc member 12 includes opposing hubs 20 which are firmly attached thereto by welding and the like. It is preferred that the welded connection of the hubs 20 to the disc be made and contoured to provide a smooth flowing surface, for avoiding the collection of material thereon, Shaft members 22 and 24 extend in opposite directions along a common axis from their respective hubs 20, The hubs 20 are preferably round with hemispherical interior ends. It is preferred that the shafts 22 and 24 have a smaller diameter than the hubs 20. Referring to FIG. 3, shaft 22 includes a reduced diameter portion 26. This reduced diameter portion 26 projects a selected distance. This reduced diameter portion 26 may be formed as a unitary piece with the shaft 22 or as a separate piece. This separate piece may be a pin, a cam follower, or the like.

Figure 1:
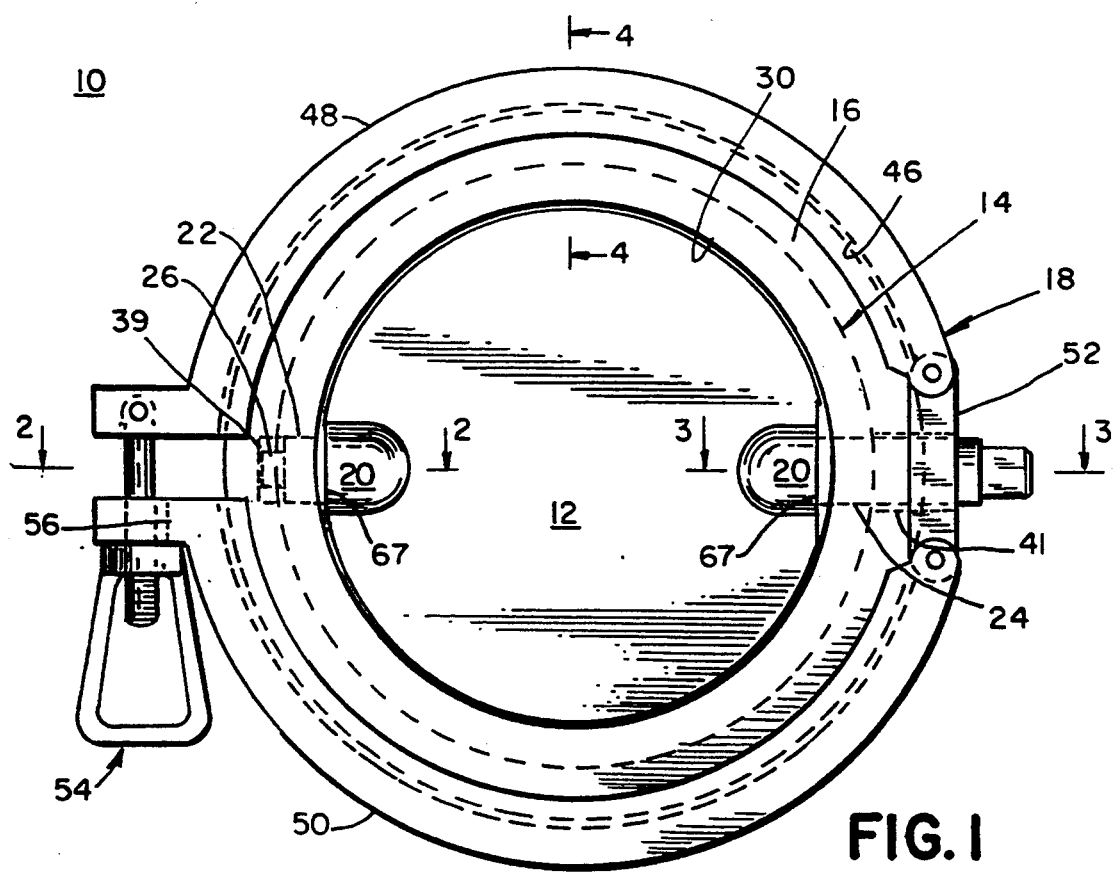
FIG. 1 represents a plan view of a modular butterfly valve of the present invention.

The shaft 24 is of sufficient length to extend exterior of the valve assembly 10, in order to provide a means for selectively rotating the disc member 12. This selective rotation controls the positioning of the disc member 12 between a closed position and an open position. The closed position is shown in FIG. 1. The end of the shaft 24 distal the hub 20 is provided with a driving end 28 such as a square, spline, and the like. Typical manual and powered drive means have been shown and discussed in U.S. Pat. No. 5,236,003. U.S. Pat. No. 5,236,003 is incorporated by reference into this disclosure to the extent that the law allows.

Figure 4:
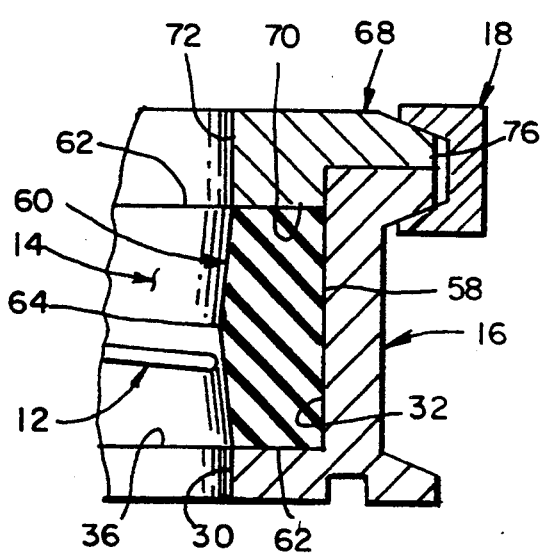
FIG. 4 represents a cross-sectional fragmentary view of the present invention, this enlarged scale view being taken along line 4—4 of FIG. 1.

It is preferred that the disc member 12 be highly polished for minimizing friction. The peripheral edge should have a radius, as shown in FIG. 4. For example, a disc member made of 11 ga. Stainless Steel, preferably has a radius of 2.54 mm. (0.100 in.).

The housing 16 includes a cylindrical through bore 30, a counterbore 32, and an outside diameter 34. The counterbore 32 is formed substantially concentric with the through bore 30. The counter bore 32 has a predetermined depth for providing a shelf 36. The housing 16 further includes a first retaining flange 38 and a second retaining flange 40. Each of the retaining flanges 38 and 40 extend radially from the outside diameter 34 of the housing 16. Each of the retaining flanges 38 and 40 are formed with a preferred contour for mating with an associated hinged coupling ring 18. A second shelf 39 is formed into the counterbore 32 of the housing 16. This second shelf 39 is selectively positioned 180 degrees from a first clearance aperture 41. This first clearance aperture 41 is sized to provide a selected clearance between its walls and shaft 24.

The coupling ring 18 has a V-shaped groove 44 formed along an interior surface 46 of its two semi-circular ring portions 48 and 50. The ring portions 48 and 50 are pivotally attached to a ink plate 52. The hinged coupling ring 18 is clamped to the housing 16 by a stud and thumb nut arrangement 54. A slotted aperture 56 allows for quick opening and/or engagement of the coupling ring 18 as needed.

Referring in particular to FIG. 4, the valve seat 14 has an outer diameter 58, a selectively contoured seat portion 60 and ends 62. This valve seat 14 is formed with a predetermined length which is measured as the distance between ends 62. The contoured seat portion 60 is shaped so that an inside diameter at the midpoint 64 between ends 62 is in the vicinity of 0.30 mm.(0.012 in.) smaller than the inside diameter at the ends 62. It is preferred that the mid point 64 have a radial crest portion which blends smoothly toward the ends 62.

This valve seat 14 is preferably made of a resilient material such as an FDA approved elastomer. The hardness of the elastomer is preferred to be in the vicinity of 40 durometer. This valve seat 14 further includes a pair of transverse apertures 66 formed therein. The apertures 66 are sized to provide a tight bearing fit with its associated shaft 22 and 24. For example, if the diameter of the shafts 22 and 24 is 19 mm. (.750 in.) the aperture should have a diameter in the vicinity of 18.4 mm (.725 in>). A face seal is provided by flats 67 that are formed along an inside surface of the seat 14. These flats 67 are sized to abut the face of the hubs 20. The distance between the opposing flats 67 is slightly less than the distance between the faces of the hubs 20. This differential in length also provides a biasing action for the disc member 12. This biasing action provides a self-centering of the disc member 12 with respect to the seat 14.

Referring again to FIGS. 1–4, a shouldered clamping ring 68 is provided to retain the valve seat 14. In this arrangement, the valve seat 14 is sealed and retained between the shelf portion 36 and a face 70 of the clamping ring 68. This clamping ring includes a second through bore 72, a pilot diameter 74, and a third retaining flange 76. The pilot diameter 74 is selectively sized to closely and removably seat into the counterbore 32 of the housing 16. The third retaining flange 76 is sized to mate with the second retaining flange 40. The third retaining flange 76 is further contoured to be held in a preferred abutted condition with the second retaining flange 40 by the hinged coupling ring 18.

In this preferred embodiment, It has been found that a clearance between the reduced diameter portion 26 and the second shelf portion in the vicinity of 0.59 mm (0.023 in) will minimize movement of the disc member 12 in the direction of material flow while retaining self-centering properties of the valve assembly. This control of the movement is especially important when the valve is used at the discharge end of large hoppers of a flowable material. A similar clearance should be provided between the first clearance aperture 41 and its shaft 24.

Figure 5:
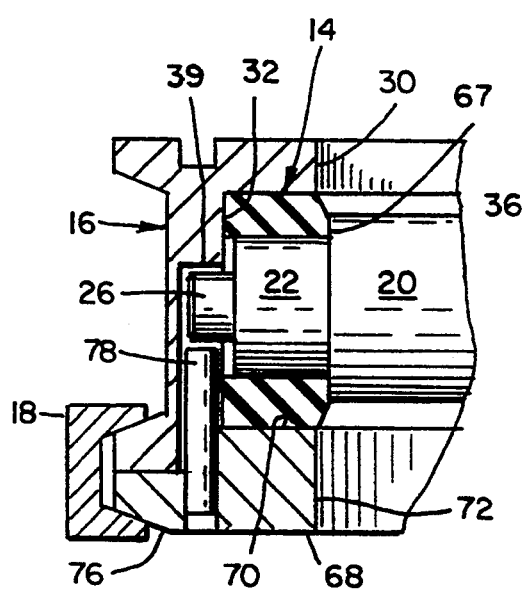
FIG. 5 represents a cross-sectional view of an alternate embodiment of the present invention, this view, being taken in the same direction as FIG. 2. but with the components rotated 180 degrees.

The first embodiment of the present invention is effective when the flow of material is in the direction of the arrow, as seen in FIG. 2. A second embodiment, shown in FIG. 5, is preferred when a reverse flow or bi directional flow is expected. In this embodiment, a stop means 78 is located opposite to the second shelf 39. A face of this stop means 78 is positioned approximately 0.59 mm. away from the reduced diameter portion 26. It has been found that a pin pressed into the shouldered clamping ring 68 provides satisfactory results. This pin arrangement also allows for easy disassembly of the valve when needed. It is anticipated that a stop block may be attached to the housing to act as a stop means. This stop means 78 limits the displacement of the disc member 12 when very heavy loads are placed on the disc member 12.

Directional terms such as "front", "back", "in", "out" downward, and the like are applicable to the embodiments shown and described in conjunction with the drawings. These terms are merely used for the purpose of description in connection with the drawings and do not necessarily apply to the position in which the coupling of the present invention may be used.

While these particular embodiments of an improved coupling have been shown and described, it is to be understood that the invention is not limited thereto and protection is sought to the brodest extent that the prior art allows.

What is claimed is:

1. A modular butterfly valve having improved load bearing capability comprising:
   a) a disc member adapted to be rotated between an open position and a closed position, said disc member having opposing hubs, each hub having a shaft member extending therefrom, a first of said shaft members having a sufficient length for extending exterior of the said butterfly valve, a second of said shaft members having a reduced diameter portion, said reduced diameter portion having a predetermined length;
   b) a housing having a first cylindrical through bore and a counterbore formed concentrically with said first cylindrical through bore, said counterbore having a determined depth for providing a shelf portion, said housing having a first retaining flange and a second retaining flange, said first retaining flange being selectively contoured for engagement by a quick coupling ring, said second retaining flange being selectively contoured for engagement by another of said quick coupling ring, a transverse aperture being adapted for allowing said first of said shaft members to pass therethrough with a predetermined first clearance, a second shelf of a predetermined size and depth, said second shelf being formed in a wall of said housing diametrically opposite said transverse aperture;
   c) a resilient valve seat having an outer diameter, a selectively contoured seat portion, and a pair of second transverse apertures, said valve seat having a predetermined length, said outer diameter being sized to closely and removably seat into said counterbore of said housing, each of said second transverse apertures having a predetermined diameter for closely journalling said first and second of said shaft members, said selectively contoured seat portion having a pair of flats formed at opposing points thereon, an axis of said second transverse apertures being selectively positioned at right angles to said flats;
   d) a clamping ring having a second through bore, a pilot diameter, and a third retaining flange, said second through bore being substantially equal in diameter to said first through bore, said pilot diameter of said clamping ring being adapted to removably seat in said counterbore while retaining said valve seat in a preferred arrangement between a face of said clamping ring and said shelf portion of said housing, said third retaining flange being sized and contoured for a coupled abutment with said second retaining flange of said housing by said quick coupling ring; and wherein said disc member is resiliently suspended and biased by said resilient valve seat for allowing self centering of said disc member in a direction transverse to a direction of material flow, a second clearance between said reduced diameter portion of said second of said shaft members and said second shelf cooperating with said first clearance for limiting movement of said disc member with respect to said valve seat in a direction parallel to a direction of material flow, 2. A modular butterfly valve as recited in claim 1 wherein said quick coupling ring includes two semi-circular ring portions, each of said semi-circular ring portions being pivotally attached at its associated end of a link plate, and each semi-circular ring portion having an end distal said pivotally attaching end being adapted for selective manual loosening or tightening.

3. A modular butterfly valve as recited in claim 2 wherein each semi-circular ring includes a v-shaped groove formed into an interior surfacer said V-shaped groove being sized for mating with and holding said clamping ring to said housing in an aligned array.

4. A modular butterfly valve as recited in claim 1 wherein said selectively contoured seat portion of said resilient valve seat includes contouring so that its inside diameter at its midpoint is reduced a predetermined amount from its inside diameter at each of its ends.

5. A modular butterfly valve as recited in claim 4 wherein said inside diameter at its midpoint includes a radial crest portion which blends smoothly toward each of said ends.

6. A modular butterfly valve as recited in claim 1 which further includes a stop means, said stop means being positioned at a predetermined distance from said second shelf for bi-laterally limiting the movement of said disc member with respect to said valve seat in a direction parallel to the direction of material flow.

7. A modular butterfly valve as recited in claim 6 wherein said stop means includes an elongated pin member, said elongated pin member being fastened to said clamping ring.

8. A modular butterfly valve as recited in claim 6 wherein said quick coupling ring includes two semi-circular ring portions, each of said semi-circular ring portions being pivotally attached at its associated end of a link plate, and each semi-circular ring portion having an end distal said pivotally attaching end being adapted for selective manual loosening or tightening.

9. A modular butterfly valve as recited in claim 8 wherein each semi-circular ring includes a v-shaped groove formed into an interior surface, said V-shaped groove being sized for mating with and holding said clamping ring to said housing in an aligned array.

10. A modular butterfly valve as recited in claim 6 wherein said selectively contoured seat portion of said resilient valve seat includes contouring so that its inside diameter at its midpoint is reduced a predetermined amount from its inside diameter at each of its ends.

11. A modular butterfly valve as recited in claim 10 wherein said inside diameter at its midpoint includes a radial crest portion which blends smoothly toward each of said ends.

* * * * *